3,279,159
LAWN EDGER AND ROTARY LAWN
MOWER BLADE
James A. Paul, 5812 Willow Glen Drive, Houston, Tex.
Filed Jan. 24, 1964, Ser. No. 339,992
7 Claims. (Cl. 56—295)

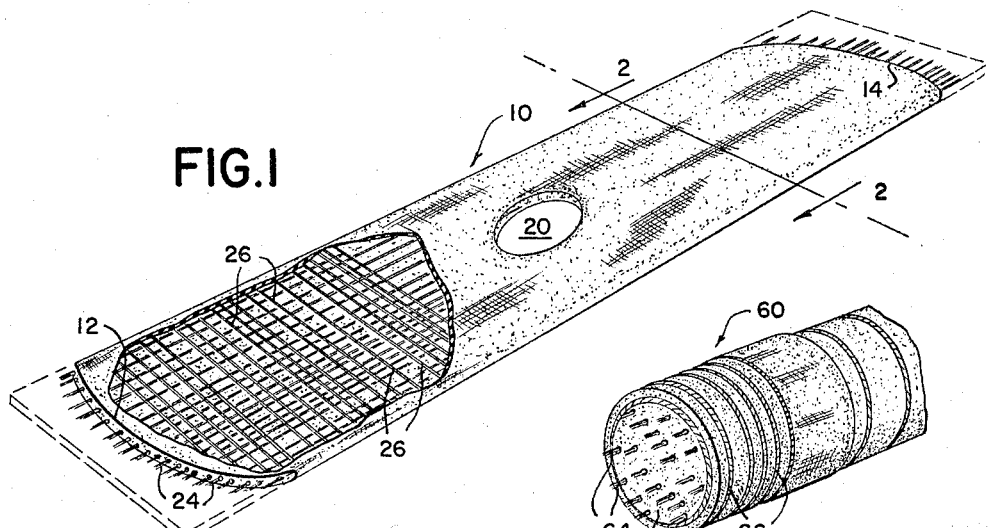
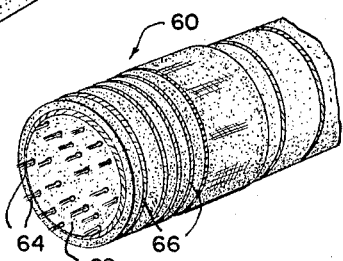
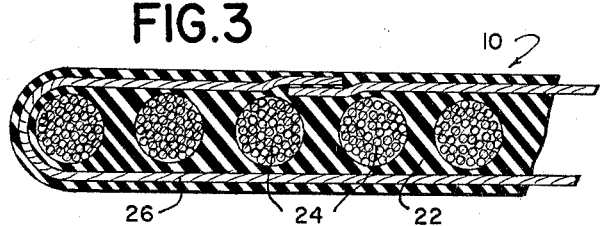
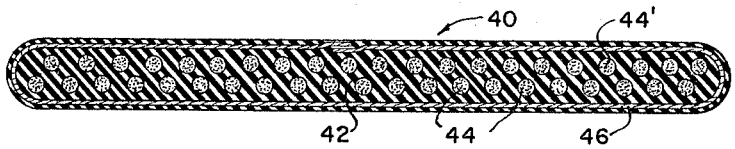
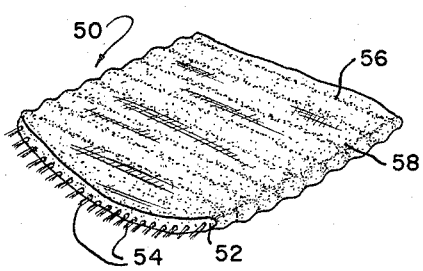
Oct. 18, 1966  J. A. PAUL  3,279,159
LAWN EDGER AND ROTARY LAWN MOWER BLADE
Filed Jan. 24, 1964
INVENTOR.
JAMES A. PAUL
BY Semmes & Semmes
ATTORNEYS

United States Patent Office 3,279,159
Patented Oct. 18, 1966

The present invention relates to mowing means and more especially to the use of so-called rotary blades in the mowing, edging and/or trimming of grass and like natural growth.

Difficulties encountered in prior art through the use of the conventional blades are well-known. Among these problems are the necessity for repeated sharpening; and too, the inherent danger attendant operation of rotary lawn mowers and edgers which may be equipped with conventional rigid blades. Impact explosion and scattering of rocks, stumps and the like occurs when the rigid or semi-rigid blade strikes. Not only does the conventional steel blade dull during use, but it tends to fling foreign objects great distances at high speeds, due to centrifugal force combined with its impact speed. Otherwise, the known danger through the weakening and breakage of power shaft renders the conventional blade undesirable. The alternative coiled flailing rod is impractical as a cutting instrument because its continued use resolves in flexing of the metal at the coil crystallizing same, resulting in its breaking off and flying out tangentially with great danger to the operator. Wire cables have also been used, and these in turn through a combination of centrifugal force and whip action to provide rigidity, have approached the answer to the problem. Nevertheless, these cables are known to become weakened by constant flexing, to untwist and unravel without control. Likewise, the use of rubber-like blade materials is impractical, due to its degeneration at the point of flexing by heat and extensive flexing, and also due to its poor cutting action.

In an effort to overcome these deficiencies, the present invention has been conceived wherein plural wire cutting element cords are set flexibly to extend lengthwise and at right angles to the axis of rotation, the same being embedded in a suitable matrix preferably with cord reinforcement wrappings running in lapped relation to each cable cord, and at substantially right angles thereto.

It is an objective of invention, therefore, to create a blade for rotary mowers, edgers and the like which is less hazardous in operation than other blades heretofore known; which is self-sharpening and unlikely to be damaged by contact with rigid foundations, fixed and movable foreign objects.

A further objective of invention is to create an unique means of cutting grass and the like, whereby the means for cutting is self-sharpening during the course of usage, exposure and wear to the natural growth which is being cut.

A further objective of invention is to create blade means for cutting grasses and the like which is not only of increased durability and safety factors, but also more economical of manufacture than known flexible blades.

With these and other objects in view, the invention may be more readily understood by reference to the ensuing drawing in which:

FIGURE 1 is a view of the blade in perspective;
FIGURE 2 is an end view in vertical cross-section of the blade taken along the lines 2—2 of FIGURE 1;
FIGURE 3 is a view in expanded cross-section of FIGURES 1 and 2;
FIGURE 4 is a cross-sectional view of modification of invention shown in FIGURES 1, 2 and 3;
FIGURE 5 is a partial perspective view of another modification of invention shown in FIGURES 1, 2 and 3; and
FIGURE 6 is a partial perspective view of yet another modification of invention shown in FIGURES 1, 2 and 3.

Referring now to the drawings, it will be noted that the blade 10 includes opposed ends 12 and 14 and sides 16 and 18. An axial aperture is provided at 20 for securing the blade to a drive shaft. Plural cords 24 comprised of twisted rubber frictioned wire cable are shown to be embedded in a matrix 22. Likewise, rubber frictioned nylon cord 26 is wrapped around the wire cord with a one inch overlap.

In practice, a useful product has been made as follows. A particular blade was made two inches wide, 3/16 of an inch thick, 9 inches long and contained an aperture of one-half inch in diameter at its center. This blade was made by obtaining a piece of rubber frictioned wire cord as used in the commercial production of Single Ply Wire Cord truck tires one and seven-eighths inches wide and nine inches long. A piece of rubber frictioned nylon cord as used in passenger tire construction measuring nine inches in width and five inches in length was wrapped around a wire cord with a one inch overlap. After the proper size center hole was punched, the entire was placed in a mold and cured fifteen minutes at 300° F., platen pressure 500 lbs. on a 7" ram. In this process, the wire cord is dipped in a bonding agent after which the cord is frictioned with rubber so that no one cord may be in direct contact with another. In practice, the nylon cord which is rubber frictioned is also dipped in the bonding agent and heat-treated similarly to the practice in the construction of nylon passenger car tires. The wire cord is conditioned similarly to that used in the construction of a single wire ply truck tire having a load rating of a 12-ply nylon truck tire.

Of particular interest in the construction of the present blade is the fact that the elements comprising the construction are uniform from end to end, the cutting cords being anchored with nylon cord and the latter being wrapped and lapped in contact with the wire cords rather than spun about the spaced wire cords ensuring that the strands of nylon cord unwind one at a time. In practice, the nylon cord wears more rapidly than the wire cord, exposing thereby the ends of the wire cord to form plural, in-line, frayed cutting edges at opposed ends of the blade. Actually, in operation, the ends of the wire cord which are exposed become frayed to form a surface as on a wire brush, and the grass which is being cut is literally brushed away. By careful reference to FIGURE 1 it will be observed that the arc created on the leading portion of each end is not a true arc, but the curve is sharper there, the trailing portion conforming to a true arc during wear. The brushing characteristic is particularly effective in striking undesirable objects such as stone, twigs and the like, as they are simply brushed aside during the course of operation. Likewise, when a relatively fixed or solid object is struck by the present blade, it twists, bending slightly upon itself, centrifugal force thereof and the spring effect of the wire cables restoring the blade to its original semi-rigid cutting configuration. This bending action ensures against bent and broken propeller shafts. It will be appreciated that this characteristic makes it possible for the edger operator to edge directly between spaced flat stones, wood and/or cement walks where grass may grow between opposed edges. In addition, when used as an edger blade, there will be no screeching or scraping sound if the blade happens to scrape against the edge of the cement curb or sidewalk.

As initially prepared for sale, the new blade comprises a substantially rectangular construction, the ends of which are not exposed (see phantom lines FIGURE 1), the parallel strands of cord being encased by the matrix material.

Shortly following initial operation, however, the matrix material will wear substantially more rapidly than either the binding or wrapping cord or the cutting wire cord. In practice, the ends of the corresponding twisted wire strands become exposed, automatically yielding continuously sharpened edges which wear substantially more slowly than does either the matrix or wrapping material. The protective covering of wrapping 26 ensures that the cutting cores will be retained in situ at all times. Additionally, although it is not apparent from the drawings, the wires comprising the cores are twisted in cable-like fashion. Accordingly, the individual strands of the wire core cable will untwist and fray during operation exposing ends thereof and yielding a wire, brush-like surface.

Among the more unique features of the invention is the fact that there is no flex action of the blade in the critical hub area adjacent the aperture 20. Ideally, the blade is secured to a propeller shaft by binding between plural washers. There is no significant heat build-up in the secured area, the blade bending or flexing simply when it strikes a solid object, or during contact against a fixed object such as curbs or sidewalks. It will be apparent that in spite of centrifugal force in action, the blade can be forcibly flexed in a transverse plane perpendicular to the axis of rotation.

It will be apparent from the foregoing that a blade of this construction is endowed with rigidity in the direction of rotation yet with flexibility of a plat, the rigidity ensuring the desired cutting action and the flexibility of plat permitting deflection and return upon meeting a foreign object. The controlled differential in the rate of wear between cutting element and outer protective covering is such as to allow for gradual, controlled exposure of the cutting element which itself is self-sharpening as it may wear.

The objective is likewise achieved through the unique correlation between the protective covering provided by the reinforcing wrappings 26, preventing thereby the cutting element cores from parting, slipping or breaking, further permitting the cutting surfaces to become exposed at a controlled amount through fraying as shown in FIGURE 1.

Modified constructions are depicted in FIGURES 4, 5 and 6. The FIGURE 4 device 40 illustrates the use of multiple rows 44 and 44' of cutting cores, such rows increasing the stability of the plate.

In the FIGURE 5 device 50, the matrix 52 is corrugated at 56 and 58 transversely to the respective cores which are embedded in an homogeneous material (less the nylon wrap). The purpose of the corrugations is to prevent the continuation of a tear or a split of the homogeneous material comprising the matrix in the event one of the wire cores should commence tearing or splitting.

In the FIGURE 6 configuration 60, the wire cores 62 are spacedly bundled instead of being set in rows as shown in FIGURES 1, 2, 3 and 4, each wire core being completely surrounded with the rubber-like or plastic material so that no one touches another. FIGURE 6 shows the outer covering to be a reinforcing wrapping 66 as in FIGURES 1, 2, 3 and 4. Corrugations of the matrix of FIGURE 6 of the type shown in FIGURE 5 can be obtained, should the material in which the cutting cores are contained be of an homogeneous nature.

From the foregoing it will become obvious that the invention in its various forms insures to the operator the following:

A. Rigidity of blade in the direction of rotation to provide direct force for cutting action in combination with flexibility of the plat to allow the blade to bend past an obstacle.

B. A self-sharpening feature of the blade by the controlled difference in rate of wear between the cutting element and the element in which it is encased.

C. A protective covering or reinforcement means around the cutting elements to prevent their parting or splitting. This protection is by the use of (a) a cord wrap around, or (b) molded wrap around corrugations.

D. Internal friction, wear and heat, which in time will damage both metal and rubber, is prevented by insulating each wire cable from each other, and from the hub fastening means which connects the blade to the shaft.

The above description is by way of illustration only, various modifications of invention having been suggested thereby and through reference to the ensuing claims.

What is claimed is:

1. The improvent in rotary lawn mower and edge blades adapted to endwise cutting comprising:
   a flexible matrix including:
   plural cutting elements as cores embedded therein, the cutting elements being flexible and of greater wear resistance than the matrix;
   the cutting elements being disposed at right angles to the rotary axis of the blade;
   reinforcing wrappings about the cutting elements and included within the matrix, said wrappings being discontinuous of each other;
   whereby continuous operational end-for-end wear of the matrix may expose the cutting elements for rigid arcuate cutting.

2. The improvement of claim 1 where said adjacent wrappings are lapped of each other and are spiraled around the cutting elements, and wherein said wrappings are cords disposed at substantial right angles to the cutting elements, said cords being of lesser wear resistance than the cutting elements.

3. The improvement according to claim 1 wherein each core comprises wire and is completely surrounded with the flexible material so that no one core touches another, and wherein the flexible matrix is essentially cylindrical in form.

4. The improvement of claim 1 in which adjacent wrappings are lapped of each other.

5. The improvement of claim 1 in which the wrappings are cords disposed at substantial right angles to the cutting elements, said cords being of lesser wear resistance than the cutting elements.

6. The improvement of claim 1 in which the reinforcing wrappings are spiraled around the cutting elements.

7. The improvement in a rotary lawn mower and edger blade adapted to endwise cutting comprising:
   (A) a blade defining flexible opposed matrix corrugations exteriorly thereof;
   (B) plural cutting cores embedded therein, said corrugations being parallel to each other and having their apices at right angles to the axes of the respective embedded cores, said cores each comprising:
   (I) multiple wired strands, twisted to form complemental in-line cables, the ends of which operationally comprise untwisted strands,
   (II) the cutting cores being flexible and of greater wear resistance than the matrix,
   whereby continuous operational end-for-end wear of the matrix may expose the cores for rigid arcuate cutting.

References Cited by the Examiner
UNITED STATES PATENTS

| | | | |
|---|---|---|---|
| 2,663,137 | 12/1953 | Asbury | 56—295 |
| 3,133,398 | 5/1964 | Tatum | 56—25.4 |

ABRAHAM G. STONE, *Primary Examiner.*

ANTONIO F. GUIDA, *Examiner.*